Figure 1:
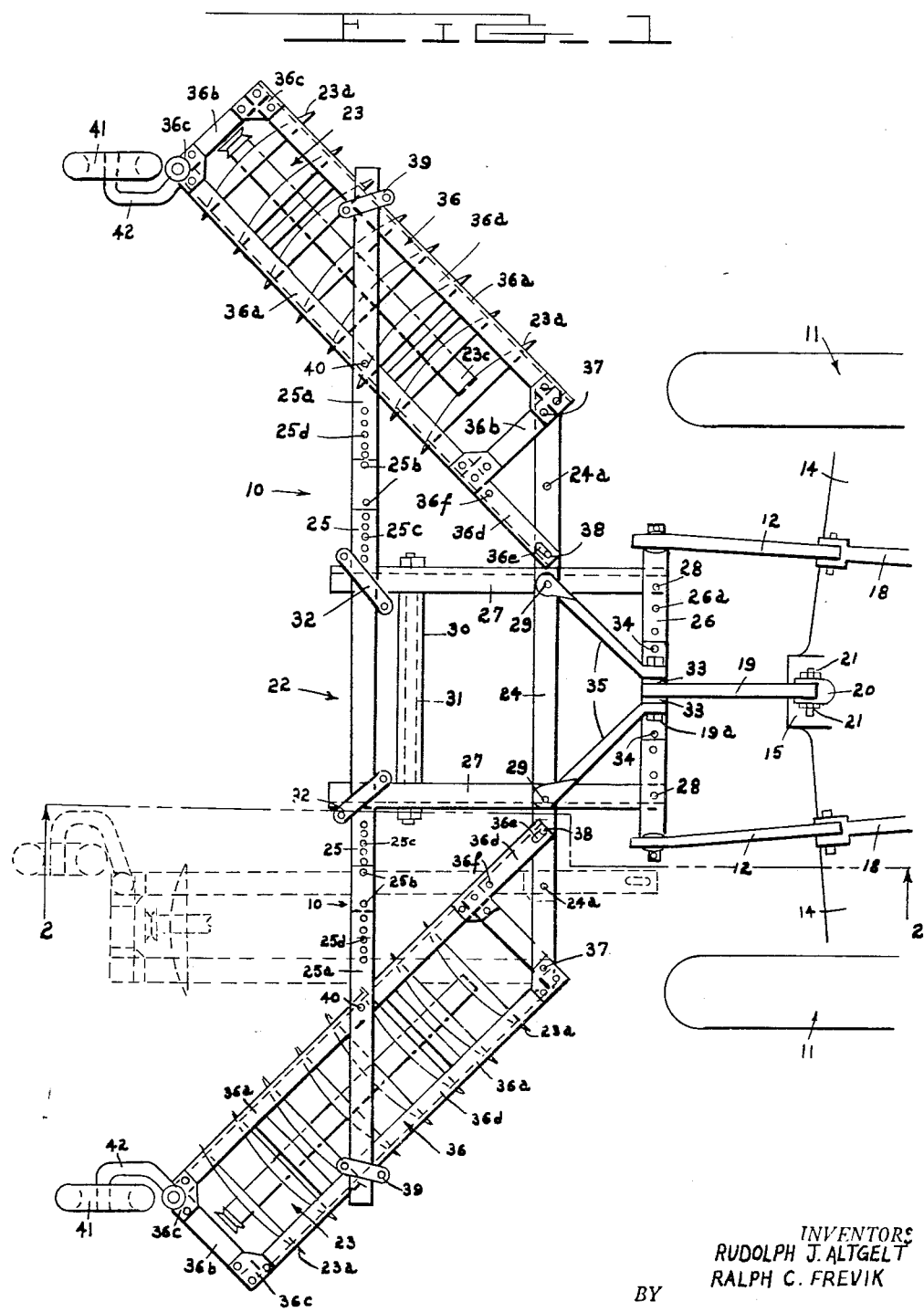

Dec. 20, 1955 R. J. ALTGELT ET AL 2,727,453
IMPLEMENT FOR ALTERNATE STRIP TILLING
Filed Nov. 23, 1951 2 Sheets-Sheet 2

INVENTORS
RUDOLPH J. ALTGELT
RALPH C. FREVIK
BY
ATTORNEY

United States Patent Office 2,727,453
Patented Dec. 20, 1955

2,727,453

IMPLEMENT FOR ALTERNATE STRIP TILLING

Rudolph J. Altgelt, South Bend, Ind., and Ralph C. Frevik, Detroit, Mich., assignors, by mesne assignments, to Ford Motor Company, Detroit, Mich., a corporation of Delaware Application November 23, 1951, Serial No. 257,842

1 Claim. (Cl. 97—53)

This invention relates to an implement for towing behind a tractor to till the soil in alternate strips for strip crop farming.

Where crops are grown in areas of relatively little rainfall, there has come into practice a system of farming called strip farming. In such a system alternate strips or belts are planted to the crop to be grown, usually small grains, with the intervening strip left unplanted. This intervening strip is generally worked during the year and such practice is known as summer fallowing. Strip farming is also practiced in contour farming so that such system is not therefore necessarily limited to relatively arid areas.

The advantages of strip farming become apparent when it is understood that alternate strips or belts growing grain or other crops in a field will greatly reduce soil erosion by breaking the force of wind and/or rain. Thus the soil in between the strips of growing crops being allowed to fallow will not be carried away by the action of the elements. However, in strip farming it is essential that the strips be of uniform width so that when tilling the unplanted strips the planted crop will not be destroyed by the tillage implements.

An implement commonly used in the wheat belt for strip farming is the well-known one-way disc plow. These tools are admirably suited for this sort of work and can till large areas with one pass of the tractor. However, because of their inherent construction they frequently impose excessive side draft on the tractor which adversely affects its steering characteristics and the quality of the tillage.

Accordingly, it is an object of this invention to provide an improved implement for strip farming which substantially cancels out side draft on the tractor by virtue of the improved arrangement of the earth working elements of the implement.

Another object of this invention is to provide an improved disc type implement for strip farming, wherein the disc gangs are angularly adjustable for obtaining the optimum working angle to suit the soil conditions.

Still another object of this invention is to provide an improved implement for tilling alternate strips of soil which is partially carried by and vertically adjusted by the power lifted trailing hitch linkage of a tractor of well-known make.

The specific nature of this invention, as well as other objects and advantages thereof, will become apparent to those skilled in the art from the following detailed description, taken in conjunction with the two sheets of drawings on which, by way of preferred example only, is illustrated one embodiment of this invention.

Figure 2:
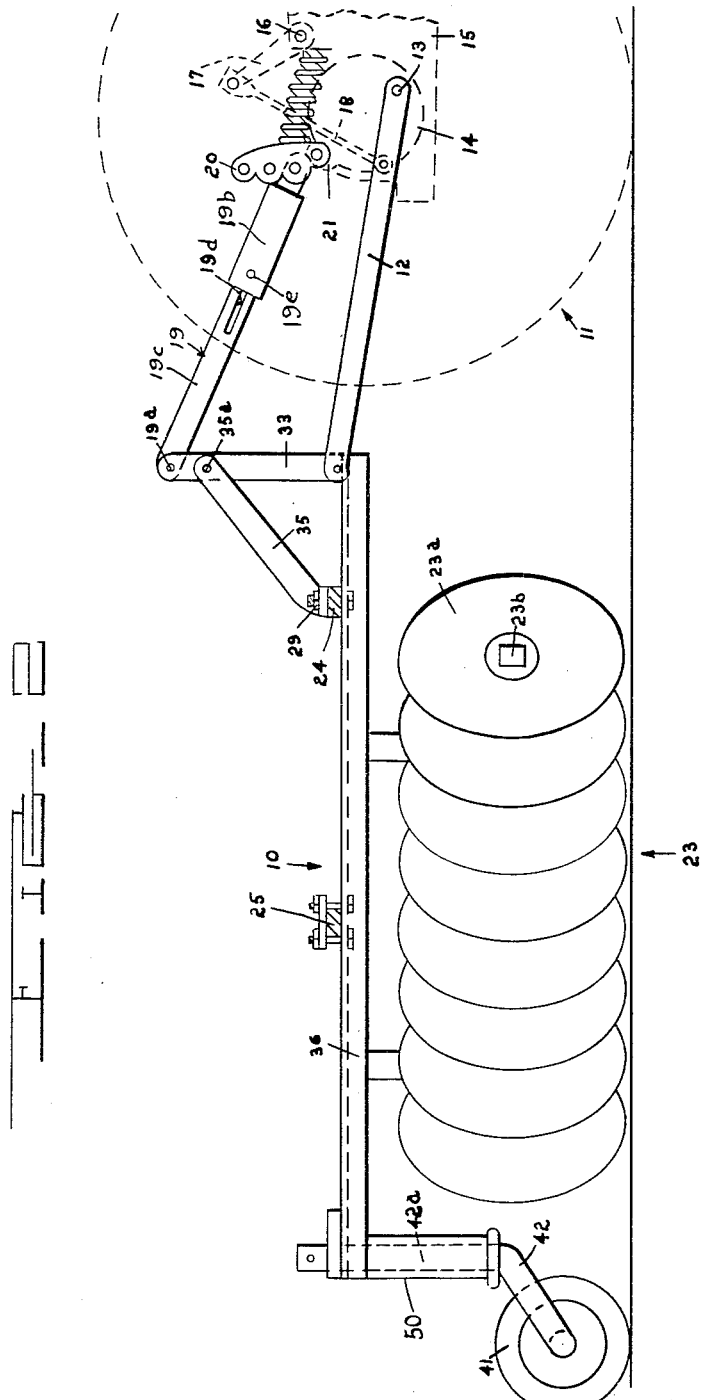

On the drawings:

Figure 1 is a plan view of the implement shown attached to the trailing hitch linkage of a tractor and illustrating in dotted outline the transporting position of one of the gangs; and Figure 2 is a sectional view of Figure 1 taken along the plane 2—2 of Figure 1.

As shown on the drawings:

The improved strip tilling implement to be presently described and indicated generally by the numeral 10 in Figures 1 and 2 is preferably used with a tractor 11 of well-known make which has a pair of trailing hitch links 12 connected at laterally spaced points 13 on the tractor rear axle housing 14. Tractor 11 has a centrally disposed differential housing 15 and on top of such housing there is provided a rock shaft 16 which is rotated by a built-in hydraulic mechanism (not shown). A pair of rock arms 17 are respectively secured to the ends of rock shaft 17, and hitch links 12 are connected to rock arms 17 by connecting links 18. Thus, rotation of rock shaft 16 effects vertical lifting of hitch links 12. A top link 19 is pivotally connected to a rocker member 20 pivotally secured between a pair of lugs 21 provided on top of the differential housing 15. The top link indicated generally at 19 is articulated to include a forward portion 19b telescopically receiving a rear portion 19c. The forward portion 19b is secured to the rocker member 20 while the rear portion 19c is secured to an implement, which will be later described, by a pivot pin 19a. The rear portion 19c is provided with a longitudinal slot 19d through which extends a slide pin 19e. It will be appreciated that the slot and pin connection of the top link portions accommodates a variation in the length of the link for a purpose hereinafter more fully described. As all of the elements of the tractor 11 are well-known, further description thereof is not believed necessary.

The implement 10 comprises a laterally extending frame 22 which is mountable upon the trailing hitch links 12 of tractor 11, as will be described, and a pair of disc gangs 23 are respectively secured to the ends of frame 22 in laterally spaced relationship. Frame 22 comprises a pair of longitudinally spaced parallel rectangular bars 24 and 25. The bar 24 forms the leading edge of frame 22. Bar 25 has end extensions 25a which are respectively secured by bolts 25b to bar 25. A plurality of vertical longitudinally spaced holes 25c are provided in bar 25 and similarly spaced holes 25d are provided in the end extensions 25a through which bolts 25b may be inserted when holes 25d are aligned with a selected pair of holes 25c to provide the desired amount of lateral extension of the end portions 25a.

Hitch links 12 transversely support a drawbar 26 which has a plurality of vertical, longitudinally spaced holes 26a. A pair of transversely spaced angle iron bars 27 have their forward ends secured to drawbar 26 by a pair of bolts 28 inserted through a selected pair of vertical holes 26a and through suitable apertures in the front ends of bar 27. Angle bars 27 project rearwardly from the drawbar 26 in parallel relationship and are respectively secured to the leading bar 24 by a pair of bolts 29. The rear ends of bars 27 are maintained in transversely spaced relationship by a tubular spacer 30 and a bolt 31 inserted through suitable apertures in bars 27 and spacer tube 30. Bar 25 is secured adjacent the trailing ends of angle bars 24 by a pair of U-shaped clamps 32. The tractor top link 19 is pivotally secured by a bolt 19a between a pair of upright struts 33 respectively secured to drawbar 26 by bolts 34. A pair of brackets 35 have their lower ends secured to bar 24 by the bolts 29 and their upper ends to the struts 33 by a bolt 35a. Thus, frame 22 is mounted on the trailing hitch links 12 of tractor 10 and upon raising of such hitch links the frame 22 may be vertically moved.

Disc gangs 23 are of any well-known construction and comprise the usual discs 23a mounted on a gang bolt 23b and maintained in longitudinally spaced relationship by spacers 23c. Disc gangs 23 are respectively secured in depending relationship by suitable bearing struts to a pair of rectangular angle iron frames 36. Frames 36 have parallel longitudinal angle iron side members 36a respectively separated at their ends by transverse end members 36b. The corners of frame 36 are reinforced by gusset plates 36c which are secured respectively to the side and end frame members as by riveting or bolting. The frames 36 have their forward corners respectively pivotally secured to the ends of bar 24 by a vertical bolt 37. The inner longitudinal frame member 36a of each frame 36 has an extension end portion 36d which has a vertical slot 36e at its forward end. A bolt 38 inserted through such slot and a suitable hole in bar 24 secures the forward end of extension 36d to bar 24. This arrangement angularly disposes the frames 36a relative to the forward travel of the tractor at which angle the disc gang will be in its working position. Slight angular adjustment of the disc gang is obtained by the slot 36e to slightly vary the working angle of the disc gang to suit soil conditions. The disc gang frames 36 are respectively secured to the trailing ends of bar extensions 25a by a pair of U-shaped clamps 39. A vertical bolt 40 provided intermediate the ends of arm extension 25a pivotally secures such extensions to the inner longitudinal frame member 36a. Upon making slight angular adjustment of the disc gang frames 36, clamps 39 are loosened which permits such clamps to slide along the outer longitudinal frame members 36a of frames 36 to permit the desired adjustment. Obviously bar extensions 25a can slide within the clamps 39.

Each of the frames 36 has a caster wheel 41 mounted on a suitable crank axle 42. Each axle has a vertical portion 42a which is rotatably mounted in a vertical hollow housing 50 suitably secured on the frame 36 for supporting the trailing ends of the disc gang frames 36. It should be mentioned here that a grain seeding box may be conveniently carried by each of the frames 36 for drilling seed, if so desired, while tilling the soil. Thus two operations may be advantageously combined in one.

For transporting purposes the disc gangs 36 may be conveniently moved inwardly to reduce the over-all width of the implement. Such is conveniently accomplished by removing the bolts 38, loosening bolts 37 and 40 as well as clamps 39. Bolts 25b which secure the extensions 25a to bar 25 are also removed whereupon the gangs are swung inwardly until a hole 36f provided in each of the frame extensions 36d is aligned with a second hole 24a outwardly spaced from the inner connecting point of the forward end of the frame extensions 36d. Bolts 38 are then inserted through such aligned holes and tightly secured. The bolts 25b are then inserted through suitable aligned holes in extensions 25a with arm 25 and the bolts 37, 40 and clamps 39 again tightened.

When the implement 10 is extended to its maximum working position shown in Figure 1, such implement is conveniently transported to the working area by raising the hitch links 12 which raises the disc gangs 23 off of the ground at their forward ends while the transporting wheels 41 maintain the frames 36 at substantially the same elevation as the forward ends from the ground. Upon reaching the working area, the links 12 are lowered whereupon the weight of the disc gangs and frame forces the discs to bite into and till the soil. It will be noted that the transporting wheels 41 drop into the furrow formed by the last disc 23a of each gang 23 and hence the trailing end of the frames 36 will be maintained at substantially the same level as the forward ends of such frames inasmuch as the portion of the trailing wheels 41 contacting the ground is at the same elevation as the discs 23a. Side draft forces produced by the disc gangs 23 effectively cancel one another so as to have no adverse effects on the steering of the tractor. Upon reaching the end of the working area the disc gangs 23 are conveniently raised out of working position by merely raising the power lifted hitch links 12 whereupon the forward ends of the gangs will first come out of the ground and finally the transporting or caster wheels 41 climb up onto unplowed ground and thereby elevate the trailing ends of the disc gangs. The variable length top link 19 accommodates elevation and lowering of the front and of the implement by raising and lowering hitch links 12 without raising the caster wheel 41 from the ground. At the same time, when the pin 19e bottoms against the rear end of the slot 19d, draft reaction from the implement 10 will be transmitted through the top link as a compressive force exerted on the rocker arm 20.

From the foregoing description it will be clearly apparent that there is here provided a simple yet effective implement for tilling alternate strips of soil. It will be appreciated that the lateral spacing of the disc gangs can be equal to the cutting width of the disc gangs so that equal strips of tilled and untilled soil can be conveniently produced. Obviously the length of the disc gangs 23 can be conveniently adjusted by the addition or subtraction of discs 23a and altering the lateral spacing of the disc gangs to conveniently provide strips of any width desired to suit combining operations for example. It will also be apparent that this improved strip tilling implement can be conveniently utilized to till alternate strips of unplanted ground between planted strips by merely spacing the tractor wheels to straddle the planted strip and run the disc gangs down the unplanted strips. Accurately spaced and uniform width strips are easily obtainable with this improved strip tillage implement because of the identical mounting of the disc gangs on opposite sides of the tractor which also advantageously cancels out any side draft effect on the tractor.

It will, of course, be understood that various details of construction may be varied through a wide range without departing from the principles of this invention and it is, therefore, not the purpose to limit the patent granted hereon otherwise than necessitated by the scope of the appended claim.

We claim:

An implement for tilling alternate strips of soil comprising a frame adapted for mounting on the tractor including a pair of parallel longitudinally spaced laterally extending leading and trailing frame bars, said trailing bar having end extensions adjustably secured thereto and projecting a substantial lateral extent beyond the ends of said leading bar, a pair of disc gangs, secondary frame members for pivotally mounting the forward ends of said gangs to the ends of said leading frame bar, clamp means for respectively securing the ends of said secondary frame members to the ends of said bar extensions thereby equally and oppositely angularly disposing said pair of disc gangs relative to said frame, a pair of extension arms respectively provided on the forward ends of said secondary frame members, means for securing said extension arms in one position to said leading bar when said gangs are angled, and means for securing said extension arms in another position to said leading bar when said gangs are pivoted to a non-angled position, said bar extensions and said clamp means being adjustable to permit said gangs to swing to the non-angled position.

References Cited in the file of this patent

UNITED STATES PATENTS

| | | |
|---|---|---|
| 838,452 | Reschke | Dec. 11, 1906 |
| 841,794 | Line | Jan. 22, 1907 |
| 965,110 | Howe | July 19, 1910 |
| 1,158,701 | McGee | Nov. 2, 1915 |
| 1,648,366 | Shields | Nov. 8, 1927 |
| 2,442,458 | Ferguson | June 1, 1948 |
| 2,562,486 | Denning | July 31, 1951 |
| 2,596,579 | McKay | May 13, 1952 |